United States Patent
Chen et al.

(10) Patent No.: US 9,182,479 B2
(45) Date of Patent: Nov. 10, 2015

(54) RADAR SYSTEM AND CONTROL METHOD THEREOF

(71) Applicant: Wistron NeWeb Corporation, Hsinchu (TW)

(72) Inventors: I-Shan Chen, Hsinchu (TW); Trsung-Fu Hsu, Hsinchu (TW); Cheng-Hsiung Hsu, Hsinchu (TW); Hsin-Lung Hsiao, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 308 days.

(21) Appl. No.: 13/850,308

(22) Filed: Mar. 26, 2013

(65) Prior Publication Data
US 2014/0168004 A1  Jun. 19, 2014

(30) Foreign Application Priority Data
Dec. 19, 2012 (TW) ............................... 101148310 A

(51) Int. Cl.
| *G01S 13/02* | (2006.01) |
|---|---|
| *G01S 13/28* | (2006.01) |
| *G01S 7/282* | (2006.01) |
| *G01S 13/10* | (2006.01) |
| *G01S 13/93* | (2006.01) |
| *G01S 7/288* | (2006.01) |

(52) U.S. Cl.
CPC ............... *G01S 13/284* (2013.01); *G01S 7/282* (2013.01); *G01S 13/103* (2013.01); *G01S 13/282* (2013.01); *G01S 13/931* (2013.01); *G01S 2007/2886* (2013.01)

(58) Field of Classification Search
CPC ... G01S 13/103; G01S 13/282; G01S 13/284; G01S 13/931; G01S 2007/2886; G01S 7/282; G06Q 10/06

USPC ........................................... 342/118, 194, 195
See application file for complete search history.

(56) References Cited

U.S. PATENT DOCUMENTS

| 5,680,137 | A | * | 10/1997 | Ando | G01S 13/34 342/127 |
|---|---|---|---|---|---|
| 5,686,921 | A | * | 11/1997 | Okada | G01S 13/10 342/127 |
| 2002/0147542 | A1 | * | 10/2002 | Tomescu | 701/120 |
| 2003/0146826 | A1 | * | 8/2003 | Viana | G01S 13/87 340/435 |
| 2008/0204150 | A1 | * | 8/2008 | Rofougaran | 331/10 |
| 2010/0090886 | A1 | * | 4/2010 | Beasley | 342/200 |
| 2012/0112806 | A1 | * | 5/2012 | Dayi | 327/145 |

FOREIGN PATENT DOCUMENTS

| CN | 102707285 A | 10/2012 |
|---|---|---|
| TW | 200808023 | 2/2008 |

* cited by examiner

*Primary Examiner* — Timothy A Brainard
(74) *Attorney, Agent, or Firm* — Winston Hsu; Scott Margo

(57) ABSTRACT

A radar system comprises a transmitting device comprising a reference frequency source, for generating a reference frequency signal; a direct-digital synthesizer, coupled to the reference frequency source, for generating a synthesized frequency signal according to the reference frequency signal; a phase lock loop, coupled to the direct-digital synthesizer, for converting the synthesized frequency signal to an output signal; a transmitting antenna, coupled to the phase lock loop, for emitting the output signal to the air; and a loop switch module, coupled to the phase lock loop, for switching the phase lock loop between an open loop mode and a closed loop mode; and at least one receiving device, for receiving at least one wireless signal, and processing the at least one wireless signal according to the output signal generated by the phase lock loop.

23 Claims, 13 Drawing Sheets

RADAR SYSTEM AND CONTROL METHOD THEREOF

BACKGROUND OF THE INVENTION

1. Field of the Invention

The present invention relates to a radar system and a control method thereof, and more particularly, to a radar system capable of enhancing the accuracy of measurement and simplifying the system structure.

2. Description of the Prior Art

With the aware of traffic security, automotive radar systems for pre-warning collision have become popular, wherein micro-wave frequency-modulation continues wave radar systems have high market share since the micro-wave radars can overcome bad weather, and have long detecting distance, etc. The radar systems have to detect distances to objects, speed, angle limitations, and achieve high resolution and accuracy as well, to determine the danger precisely, and warn the drivers accordingly, such that the drivers can react like braking, decelerating, changing lanes, etc. However, there are bottlenecks for designing the automotive radar systems, such as determination of steady and moving objects, recognition of multiple and fake objects, measurement errors, complicated system structure, etc.

Therefore, providing a radar system capable of enhancing the accuracy of measurement and simplifying the system structure becomes one of the industry goals.

SUMMARY OF THE INVENTION

It is therefore an objective of the present invention to provide a radar system capable of raising accuracy of measurement and simplifying system structure.

The present invention discloses a radar system. The radar system comprises a transmitting device comprising a reference frequency source, for generating a reference frequency signal; a direct-digital synthesizer, coupled to the reference frequency source, for generating a synthesized frequency signal according to the reference frequency signal; a phase lock loop, coupled to the direct-digital synthesizer, for converting the synthesized frequency signal to an output signal; a transmitting antenna, coupled to the phase lock loop, for emitting the output signal to the air; and a loop switch module, coupled to the phase lock loop, for switching the phase lock loop between an open loop mode and a closed loop mode; and at least one receiving device, for receiving at least one wireless signal, and processing the at least one wireless signal according to the output signal generated by the phase lock loop.

The present invention discloses a radar system. The radar system comprises a transmitting device comprising a reference frequency source, for generating a reference frequency signal; a two-output phase lock loop, coupled to the reference frequency source, for generating a first phase lock signal and a second phase lock signal according to the reference frequency signal; a first direct-digital synthesizer, coupled to the two-output phase lock loop, for generating a first synthesized frequency signal according to the first phase lock signal; a second direct-digital synthesizer, coupled to the two-output phase lock loop, for generating a second synthesized frequency signal according to the second phase lock signal; a first multiplier, coupled to the first direct-digital synthesizer and the second direct-digital synthesizer, for performing multiplication between the first synthesized frequency signal and the second synthesized frequency signal, to generate a mixed signal comprising a frequency difference between the first synthesized frequency signal and the second synthesized frequency signal; and a transmitting antenna, coupled to the first direct-digital synthesizer, for emitting the first synthesized frequency signal to the air; and at least one receiving device, for receiving at least one wireless signal, processing the at least one wireless signal according to the first synthesized frequency signal, and adjusting an expending timing factor according to the mixed signal.

The present invention discloses a radar system. The radar system comprises a transmitting device comprising a chirp waveform generator, for generating a frequency-domain output signal; an impulse generator, for generating a time-domain output signal; a transmitting antenna; a switch, coupled to the chirp waveform generator, the impulse generator and the transmitting antenna, for switching the transmitting antenna to conduct the chirp waveform generator or the impulse generator according to a control signal, so as to emit the frequency-domain output signal or the time-domain output signal through the transmitting antenna to the air; and a controller, for generating the control signal; and at least one receiving device, for receiving at least one wireless signal, and processing the at least one wireless signal according to signals outputted from the switch to the transmitting antenna.

The present invention discloses a control method for a radar system, wherein a transmitting device of the radar system comprising a chirp waveform generator and an impulse generator, for generating a frequency-domain output signal and a time-domain output signal respectively. The control method comprises determining a distance between an object and the radar system according to signals received by at least one receiving device of the radar system; and emitting the time-domain output signal generated by the impulse generator to the air when the distance is greater than a threshold, and emitting the frequency-domain output signal generated by the chirp waveform generator to the air when the distance is less or equal to the threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
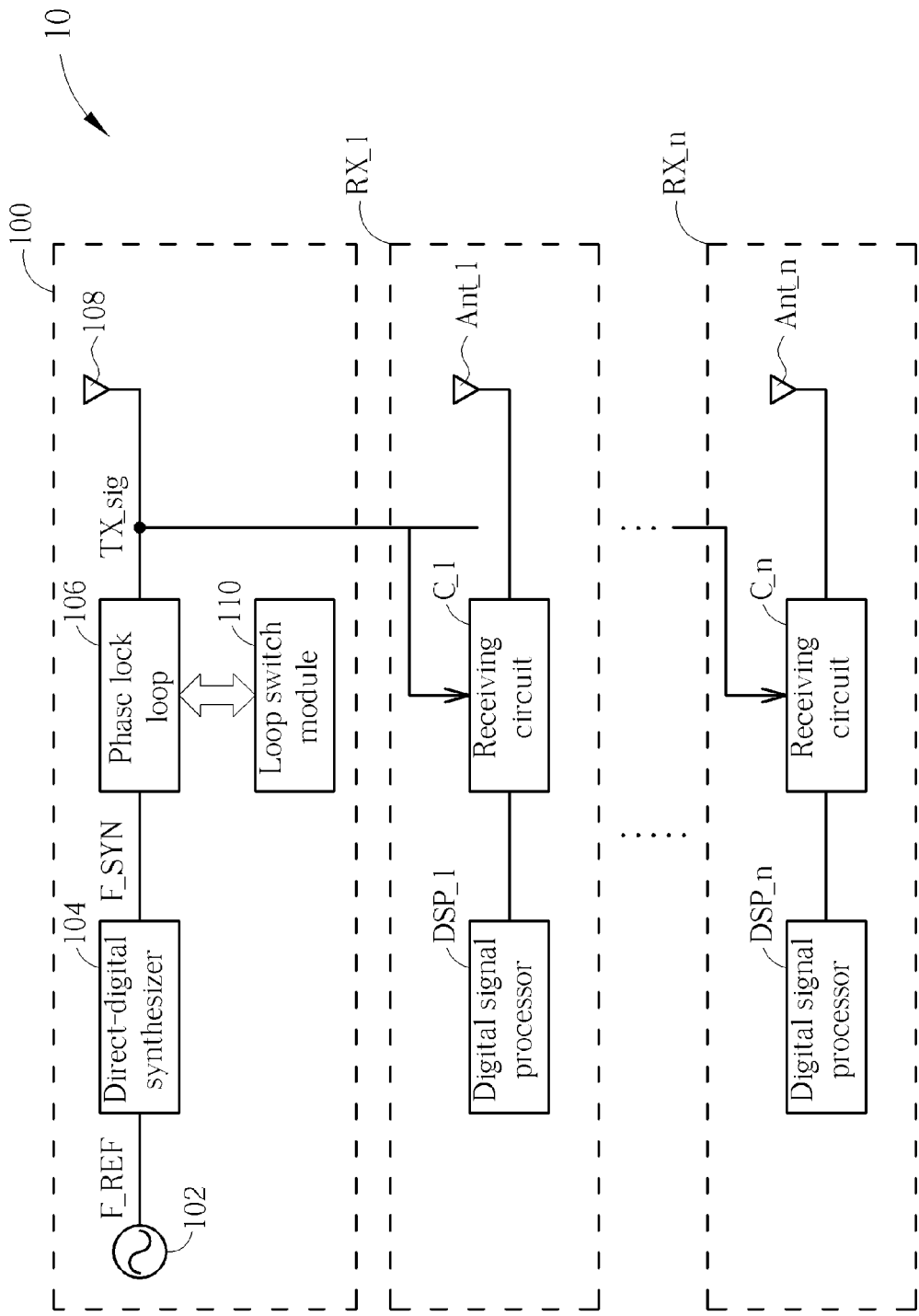
FIG. 1 is a schematic diagram of a radar system according to an embodiment of the present invention.

Please refer to FIG. 1. FIG. 1 is a schematic diagram of a radar system 10 according to an embodiment of the present invention. The radar system 10 is a frequency-modulation compressed radar system, and comprises a transmitting device 100 and n receiving devices RX_1-RX_n. In other words, the radar system 10 is a one-transmission-n-reception frequency-modulation compressed radar system. In detail, the transmitting device 100 comprises a reference frequency source 102, a direct-digital synthesizer 104, a phase lock loop 106, a transmitting antenna 108 and a loop switch module 110. The reference frequency source 102 is utilized for generating a reference frequency signal F_REF. The direct-digital synthesizer 104 is coupled to the reference frequency source 102, and is utilized for generating a synthesized frequency signal F_SYN according to the reference frequency signal F_REF. The phase lock loop 106 is coupled to the direct-digital synthesizer 104, and is utilized for converting the synthesized frequency signal F_SYN to an output signal TX_sig. The transmitting antenna 108 is coupled to the phase lock loop 106, and is utilized for emitting the output signal TX_sig to the air. Besides, the loop switch module 110 is coupled to the phase lock loop 106, and is utilized for switching the phase lock loop 106 between a closed loop mode and an open loop mode. On the other hand, each of the receiving devices RX_1-RX_n is composed of a digital signal processor (presented as DSP_1-DSP_n), a receiving circuit (presented as C_1-C_n) and a receiving antenna (presented as Ant_1-Ant_n), and is utilized for downconverting wireless signals received by the receiving antenna according to the output signal TX_sig, so as to process (such as sample) the wireless signals by the digital signal processor.

In the radar system 10, the direct-digital synthesizer 104 provides the reference frequency for the transmitting device 100 via the phase lock loop 106. Since the direct-digital synthesizer 104 has advantages including fast frequency converting, high frequency resolution, continuous output phase, programmable ability, all digitalized and flexible control, generation of waveforms emitting by the frequency-modulation radar becomes faster. In addition, the loop switch module 110 may switch the phase lock loop 106 between the closed loop mode and the open loop mode. When the loop switch module 110 switches the phase lock loop 106 to the closed loop mode, frequencies of signals received by the receiving devices RX_1-RX_n are synchronized with the output signal TX_sig, to enhance accuracy of the frequencies and determine direct current (dc) voltage and transmitting power of the circuits. Therefore, the closed loop mode can be utilized for shipments of products or power-on auto-calibration, to enhance the yield rate of the products. Besides, when the loop switch module 110 switches the phase lock loop 106 to the open loop mode, sinusoidal waves are stably outputted and the structure is simplified, to fasten processing of receiving signals. Therefore, the open loop mode can be utilized for an activation mode after power-on auto-calibration, to ensure that the system circuits which had been calibrated are not affected.

Figure 2:
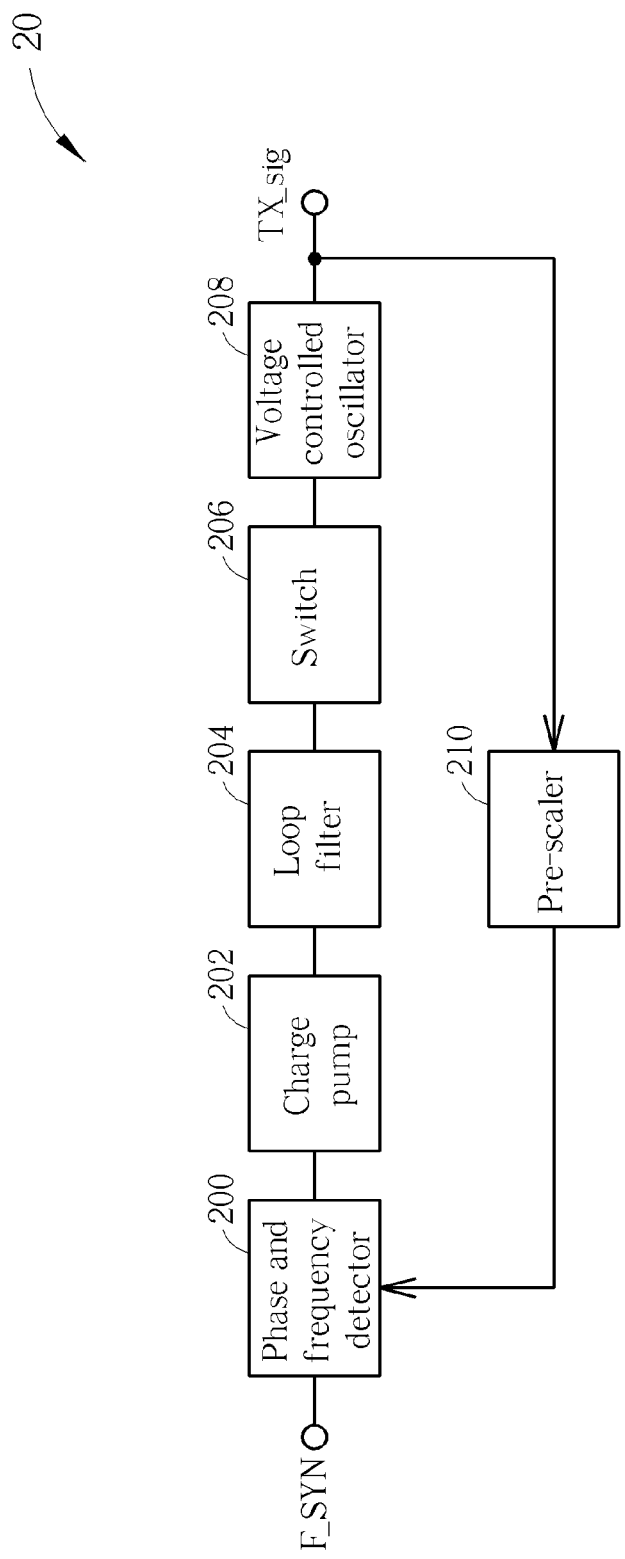
FIG. 2 is a schematic diagram of a transmitting circuit according to an embodiment of the present invention.

Noticeably, FIG. 1 is an embodiment of the present invention. Those skilled in the art can make modification and alterations accordingly. For example, the loop switch module 110 is utilized for switching the phase lock loop 106 between the closed loop mode and the open loop mode, but is not limited thereto. For example, FIG. 2 is a schematic diagram of a transmitting circuit 20 according to an embodiment of the present invention. The transmitting circuit 20 is utilized for realizing the phase lock loop 106 and the loop switch module 110 shown in FIG. 1. The transmitting circuit 20 comprises a phase and frequency detector 200, a charge pump 202, a loop filter 204, a switch 206, a voltage controlled oscillator 208 and a pre-scaler 210, wherein the phase and frequency detector 200, the charge pump 202, the loop filter 204, the voltage controlled oscillator 208 and the pre-scaler 210 are utilized for realizing the phase lock loop 106 whose operation should be well-known by those skilled in the art, and is not narrated hereinafter. The switch 206 is disposed between the loop filter 204 and the voltage controlled oscillator 208 for conducting or disconnecting a connection between the loop filter 204 and the voltage controlled oscillator 208, to switch the operation between the closed loop mode and the open loop mode. When the operation is switched to the open loop mode, a compensating circuit built in the voltage controlled oscillator 208 stabilizes outputs of sinusoidal waves, such that the processing time of receiving signals is shortened.

Figure 3:
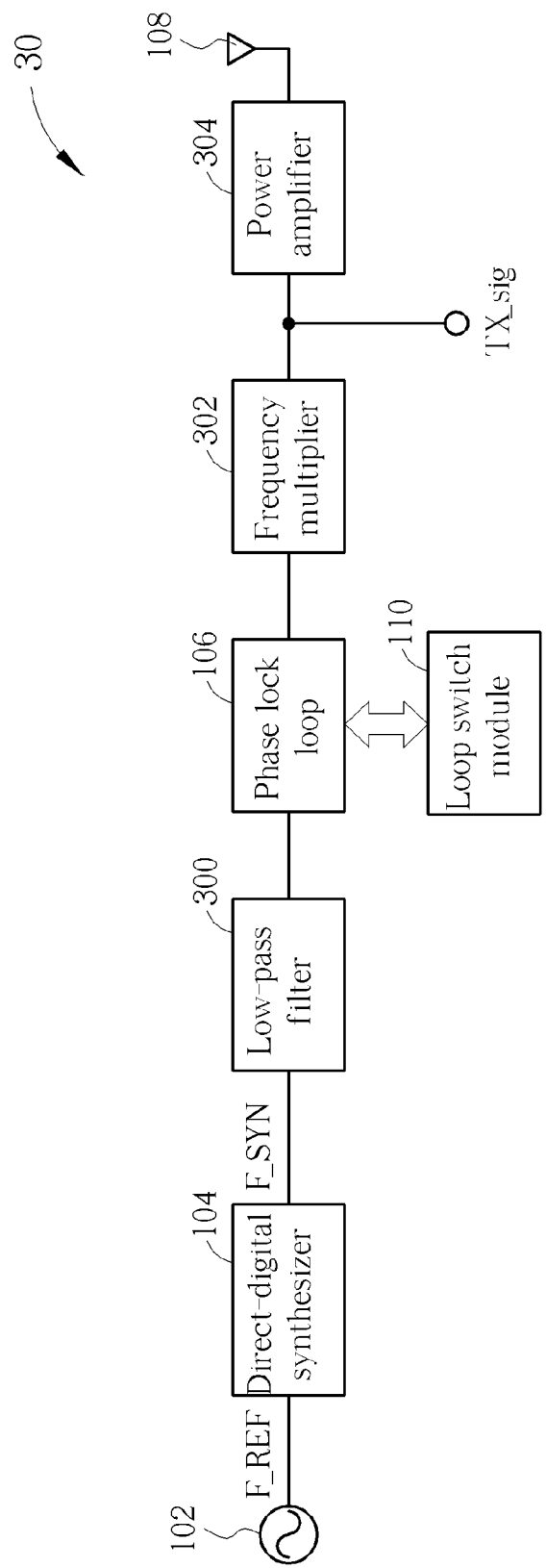
FIG. 3 is a schematic diagram of a transmitting device according to an embodiment of the present invention.

Besides, FIG. 1 illustrates different function blocks to represent components of realizing the embodiments of the present invention, but is not limited thereto. Those skilled in the art can make adjustments according to system requirements. For example, FIG. 3 is a schematic diagram of a transmitting device 30 according to an embodiment of the present invention. Structures of the transmitting device 30 and the transmitting device 100 shown in FIG. 1 are similar, and thus the same elements are denoted by the same symbols. A difference between the transmitting device 30 and the transmitting device 100 is that in comparison with the transmitting device 100, the transmitting device 30 further includes a low-pass filter 300, a frequency multiplier 302 and a power amplifier 304 for performing low-pass filtering, multiplying frequency and amplifying power. The operations should be well-known by those skilled in the art.

On the other hand, the receiving devices RX_1-RX_n are utilized for downconverting and sampling the received signals according to the output signal TX_sig, wherein the number n and design of the receiving circuits C_1-C_n can be properly modified according to different applications. For example, in an application of an automotive radar system, the number n of the receiving devices RX_1-RX_n may be preferably 2, whereas the radar system 10 is an one-transmission-two-reception frequency-modulation compressed radar system for detecting the relative speed, distance, and angle between an object and a car, to realize a forward collision warning system. Besides, the design of the receiving circuits C_1-C_n can be adjusted according to different applications. For example, please refer to FIG. 4, which is a schematic diagram of a receiving device RX_x according to an embodiment of the present invention. The receiving device RX_x may realize any of the receiving devices RX_1-RX_n shown in FIG. 1, and has the same structure with the receiving devices RX_1-RX_n. The receiving device RX_x comprises a digital signal processor DSP_x, a receiving circuit C_x and a receiving antenna Ant_x. The receiving circuit C_x converts a received signal into an in-phase component and a quadrature component, and comprises a low noise amplifier 400, a balanced-to-unbalanced converter (BALUN converter) 402, a mixer 404, a quadrature device 406, a low-pass filters 408, 410, an intermediate frequency amplifiers 412, 414, band-pass filters 416, 418 and analog-to-digital converters 420, 422. The receiving device RX_x converts the output signal TX_sig into an in-phase signal I (TX_sig) and a quadrature signal Q (TX_sig) through the quadrature device 406, such that the mixer 404 sends receiving signals to the in-phase channel and the quadrature channel, so as to decode, convert and calculate frequency, timing and phase through the digital signal processor DSP_x, to obtain data of the distance, relative speed and angles between the car and the object. A structure of the receiving device RX_x is a super heterodyne receiver, whose operation should be well-known by those skilled in the art.

Figure 4:
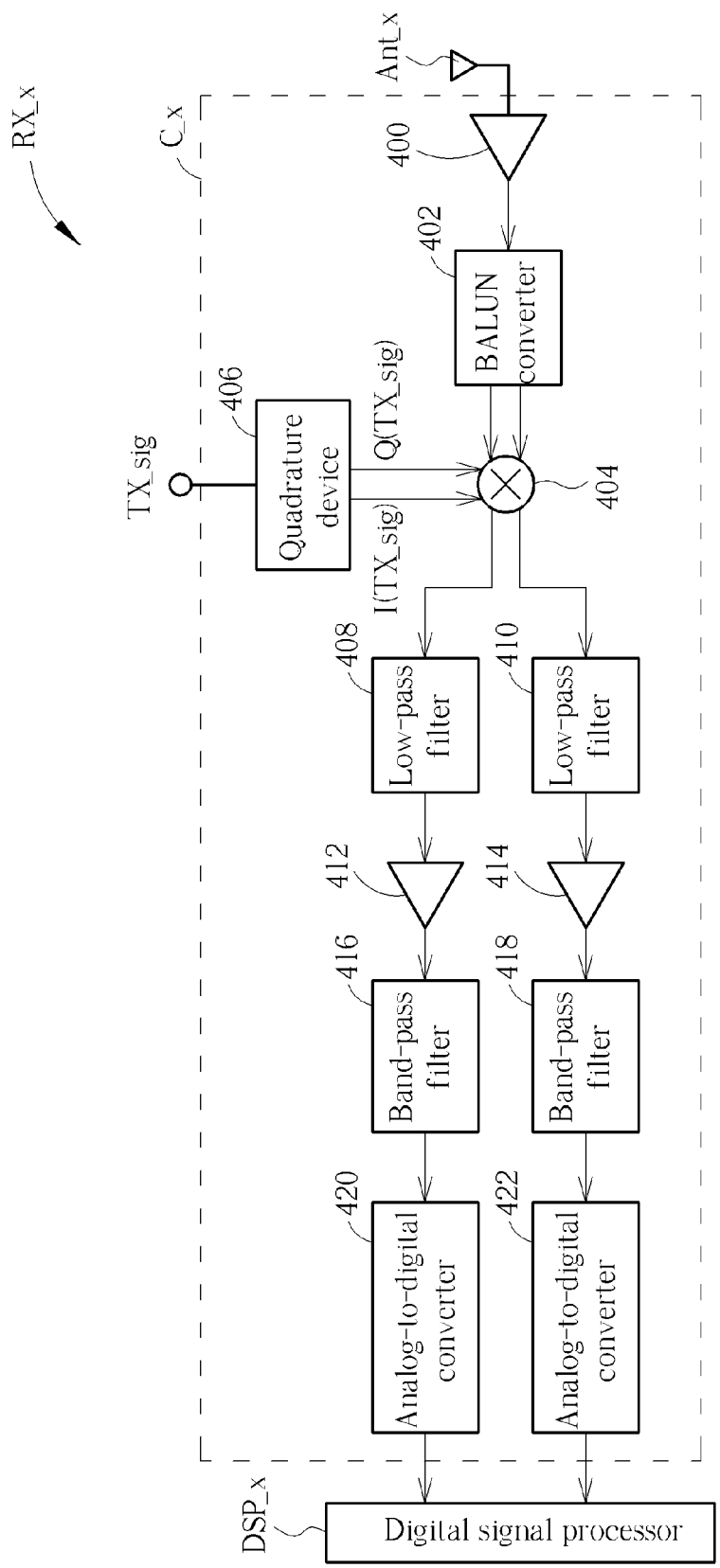
FIG. 4 is a schematic diagram of a receiving device according to an embodiment of the present invention.

Noticeably, the receiving device RX_x shown in FIG. 4 may realize the receiving devices $RX_1$-$RX_n$ shown in FIG. 1, but not limited thereto. Any receiving devices that can process the output signal correctly according to the signal TX_sig can be applied to the present invention.

In the radar system 10, since the direct-digital synthesizer 104 has advantages of fast frequency converting, high frequency resolution, continuous output phase, programmable ability, all digitalized and flexible control, generation of radar waveforms becomes faster. Meanwhile, by switching the closed loop mode and the open loop mode, the voltage controlled oscillator does not need to be modified in normal operation, and thus shorten the processing time of the receiving signal and simplify the structure.

Figure 5:
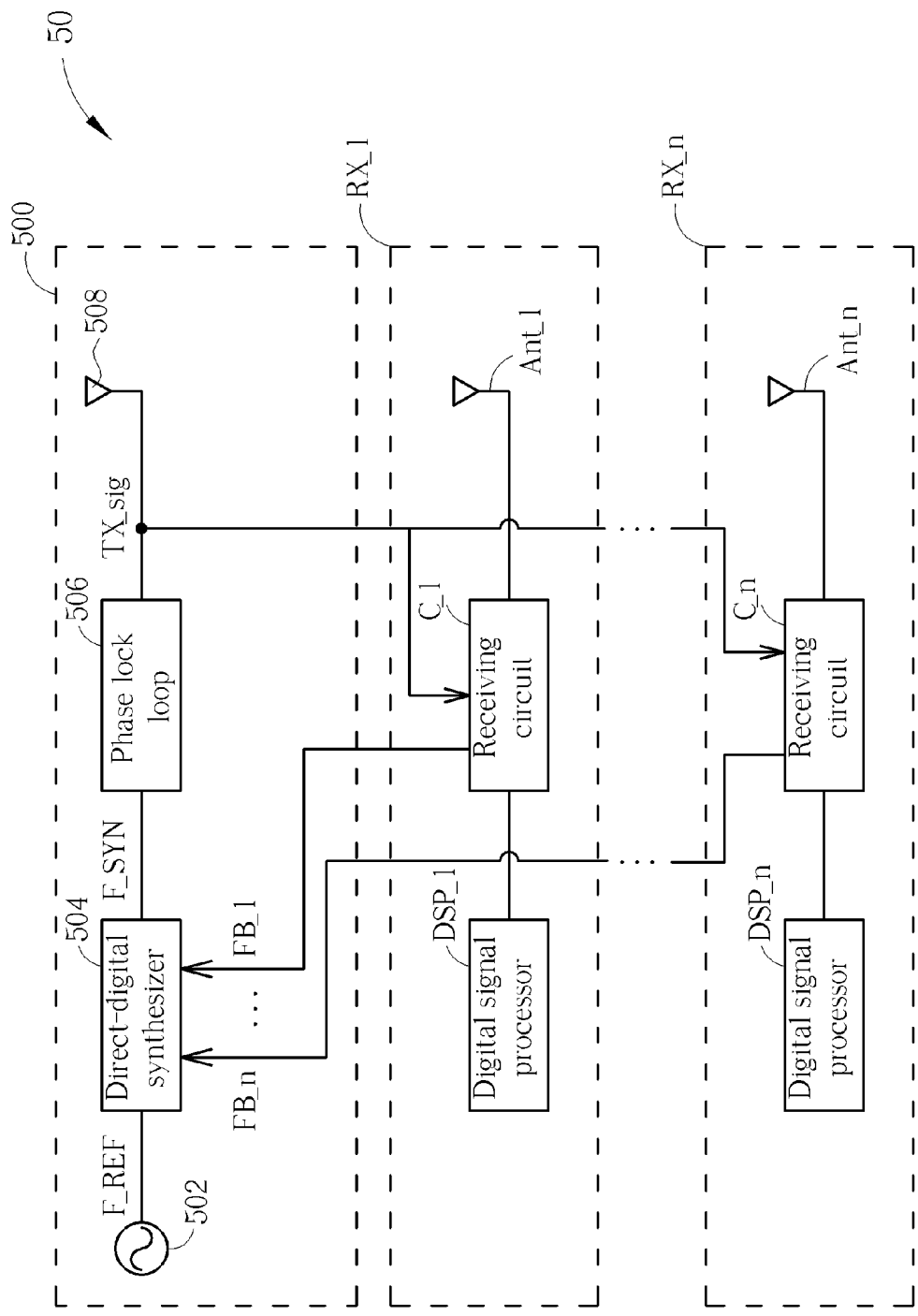
FIG. 5 is a schematic diagram of a radar system according to an embodiment of the present invention.

Besides, since the direct-digital synthesizer has the advantages of programmable ability, all digitalized and flexible control, the direct-digital synthesizer may perform compensation of frequencies, phases and amplitudes directly according to the receiving signals. For example, please refer to FIG. 5, which is a schematic diagram of a radar system 50 according to an embodiment of the present invention. The radar system 50 is a frequency-modulation compressed radar system, and comprises a transmitting device 500 and n receiving devices $RX_1$-$RX_n$. As can be seen by comparing FIG. 1 and FIG. 5, structures of the radar system 50 and the radar system 10 are similar, and the related derived variation can be referred to the previous description (such as the embodiment shown in FIG. 3). The transmitting device 500 comprises a reference frequency source 502, a direct-digital synthesizer 504, a phase lock loop 506 and a transmitting antenna 508. The receiving devices RX_1-RX_n are the same as the radar system 10, and each receiving device is composed of a digital signal processor (presented as DSP_1-DSP_n), a receiving circuit (presented as C_1-C_n) and a receiving antenna (presented as Ant_1-Ant_n). A difference between the radar system 50 and the radar system 10 is that the radar system 50 does not transfer the feedback signals FB_1-FB_n to the direct-digital synthesizer 504 through switching the loop filter mode, but through the receiving circuits C_1-C_n of the receiving devices RX_1-RX_n to perform compensation of frequencies, phases and amplitudes, and improve accuracy of signals after demodulation. Noticeably, the feedback signals FB_1-FB_n represent signals transmitted from the receiving circuits C_1-C_n to the direct-digital synthesizer 504, and may be mixed signals, composite signals, differential signals, etc. For example, if the receiving devices RX_1-RX_n are realized by the receiving device RX_x shown in FIG. 4, each of the feedback signals FB_1-FB_n may be a combination of the in-phase component and the quadrature component of the receiving signal. For example, output signals from the intermediate frequency amplifiers 412, 414 (i.e. the signals between the intermediate frequency amplifier 412, 414 and the band-pass filter 416, 418) may be taken to form a group of feedback signals. Accordingly, the direct-digital synthesizer 504 may perform compensation of frequencies, phases and amplitudes, to improve accuracy of signals after demodulation.

The radar systems 10 and 50 mentioned above both use the direct-digital synthesizers to output the reference frequency for the phase lock loop, to generate the output signal TX_sig. In other words, the radar systems 10, 50 are both frequency-modulation compressed radar systems that have an advantage of detecting objects of middle or short distance. In addition, advantages of the direct-digital synthesizer may further be applied to a structure of an impulse compression radar system to detect long distance objects.

Figure 6:
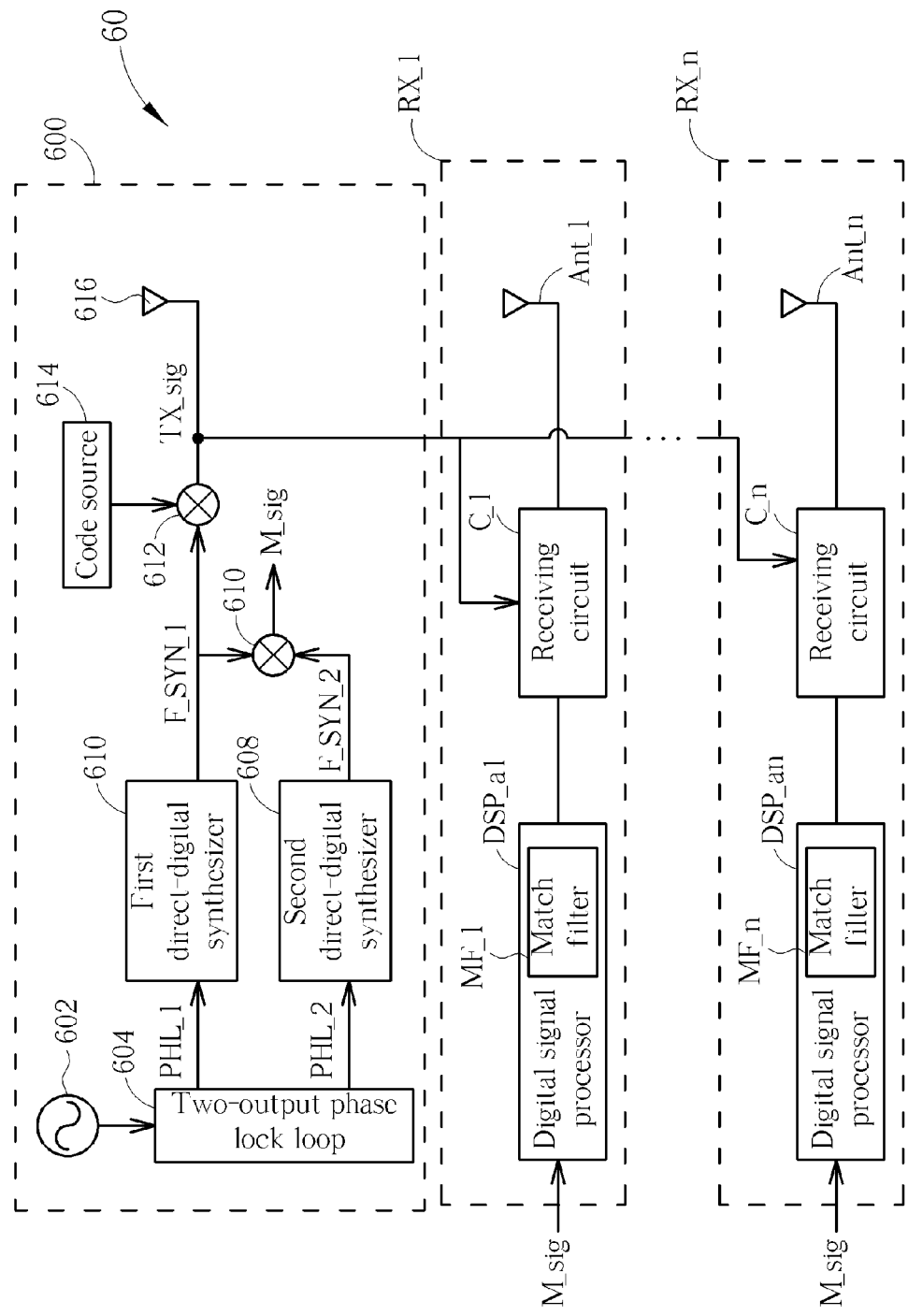
FIG. 6 is a schematic diagram of a radar system according to an embodiment of the present invention.

For example, please refer to FIG. 6, which is a schematic diagram of a radar system 60 according to an embodiment of the present invention. The radar system 60 is an impulse compression radar system, and comprises a transmitting device 600 and n receiving devices RX_1-RX_n. The transmitting device 600 comprises a reference frequency source 602, a two-output phase lock loop 604, a first direct-digital synthesizer 606, a second direct-digital synthesizer 608, a first multiplier 610, a second multiplier 612, a code source 614 and a transmitting antenna 616. Besides, structures of the receiving devices RX_1-RX_n are similar to the embodiment shown in FIG. 1, and thus the same components are denoted by the same symbols. The digital signal processors DSP_1-DSP_n shown in FIG. 1 are replaced by the digital signal processors DSP_a1-DSP_an. The digital signal processors DSP_a1-DSP_an may adjust match filters MF_1-MF_n according to a mixed signal M_sig outputted by the first multiplier 610, to enhance an expanding time factor for demodulation.

In detail, the two-output phase lock loop 604 generates a first phase lock signal PHL_1 and a second phase lock signal PHL_2 to a first direct-digital synthesizer 606 and a second direct-digital synthesizer 608 according to the reference frequency signal F_REF generating by the reference frequency source 602, and thus the first direct-digital synthesizer 606 and the second direct-digital synthesizer 608 generate a first synthesized frequency signal F_SYN_1 and a second synthesized frequency signal F_SYN_2 according to the first phase lock signal PHL_1 and the second phase lock signal PHL_2. The code source 614 generates a sequence code, and multiplies (compresses) the sequence code by the first synthesized frequency signal F_SYN_1 through the second multiplier 612 to generate the output signal TX_sig which is then emitted to the air through the transmitting antenna 616. On the other hand, the first multiplier 610 multiplies (compresses) the synthesized frequency signal F_SYN_1 by the second synthesized frequency signal F_SYN_2 to generate a mixed signal M_sig. Under such a condition, the mixed signal M_sig comprises information of frequency difference between the first synthesized frequency signal F_SYN_1 and the second synthesized frequency signal F_SYN_2. Accordingly, the digital signal processors DSP_a1-DSP_an may adjust the sampling frequency, to enhance the expanding time factor to obtain more sampling points.

Relation between expanding time factor and sampling should be well-known by those skilled in the art. In short, in the radar system 60, after the second multiplier 612 compresses (multiplies) the synthesized frequency signal F_SYN_1 and the sequence code generated by the code source 614, an emitted signal (the output signal TX_sig) and sampling signals of the receiving devices RX_1-RX_n have pulse repetition frequency (PRF), and the mixed signals M_sig generated by the first direct-digital synthesizer 606 and the second direct-digital synthesizer 608 through continuously sampling carry information of frequency difference, which can be accurately processed by the digital signal processors DSP_a1-DSP_an. For example, when a period of a radio frequency signal and a period of a sampling signal are different, progress of frequency mixing would generate the expanding time factor, which is affected by a period of the emitted frequency and a period of the sampling frequency. When a difference between two periodic signals becomes smaller, the expanding time factor increases and a high frequency signal can be downconverted to middle frequency by mixing with the sampling frequency, such that the digital signal processors DSP_a1-DSP_an may obtain more samples to facilitate demodulation.

Besides, in the radar system 60, the second multiplier 612 multiplies the first synthesized frequency signal F_SYN_1 by the sequence code generated by the code source 614, to realize impulse compression and a coding mechanism. The coding mechanism may carry information, enhance transmission accuracy, or realize dedicated short range communications technology. For example, in an automotive radar system, the sequence code generated by the code source 614 may carry a notification message of emergent aid, by which an ambulance may send an expressed pass requirement information to a mobile control center, to let the mobile control center to control traffic signs on the way of the ambulance in advance (automatically), to enhance safety protection. In addition, the sequence code generated by the code source 614 is utilized for calculating relative variables. Accordingly, the digital signal processors DSP_a1-DSP_an can use the same sequence code to determine the accuracy of the received signals. Utilizing coding mechanism to realize different communication functions should be well-known by those skilled in the art, and those skilled in the art can make modifications and alterations accordingly.

Noticeably, FIG. 6 is an embodiment of the present invention. Those skilled in the art can make modification and alterations accordingly. For example, a frequency multiplier and a power amplifier (as shown in FIG. 3) may be added between the second multiplier 612 and the transmitting antenna 616, to process frequency multiplication and power amplification, whose operation should be well-known by those skilled in the art. Similarly, the number n of the receiving devices RX_1-RX_n, and design of the receiving circuits C_1-C_n may be adjusted appropriately according to different applications. If the receiving circuits C_1-C_n are realized as the receiving circuit C_x shown in FIG. 4, each of the match filters MF_1-MF_n shown in FIG. 6 represents one group (two) of match filters, and those skilled in the art can make modifications and alterations accordingly.

The radar system 60 applies the impulse compression to output radar signals, and effectively solves the paradox between radar effective distance and distance range resolution, to raise distance of detection. In other words, the radar system 60 can be applied to long distance detection. Under such a condition, if the radar system 60 and the radar system 10 or 50 are integrated, a radar system can be realized for short, middle and long distance detection.

Figure 7:
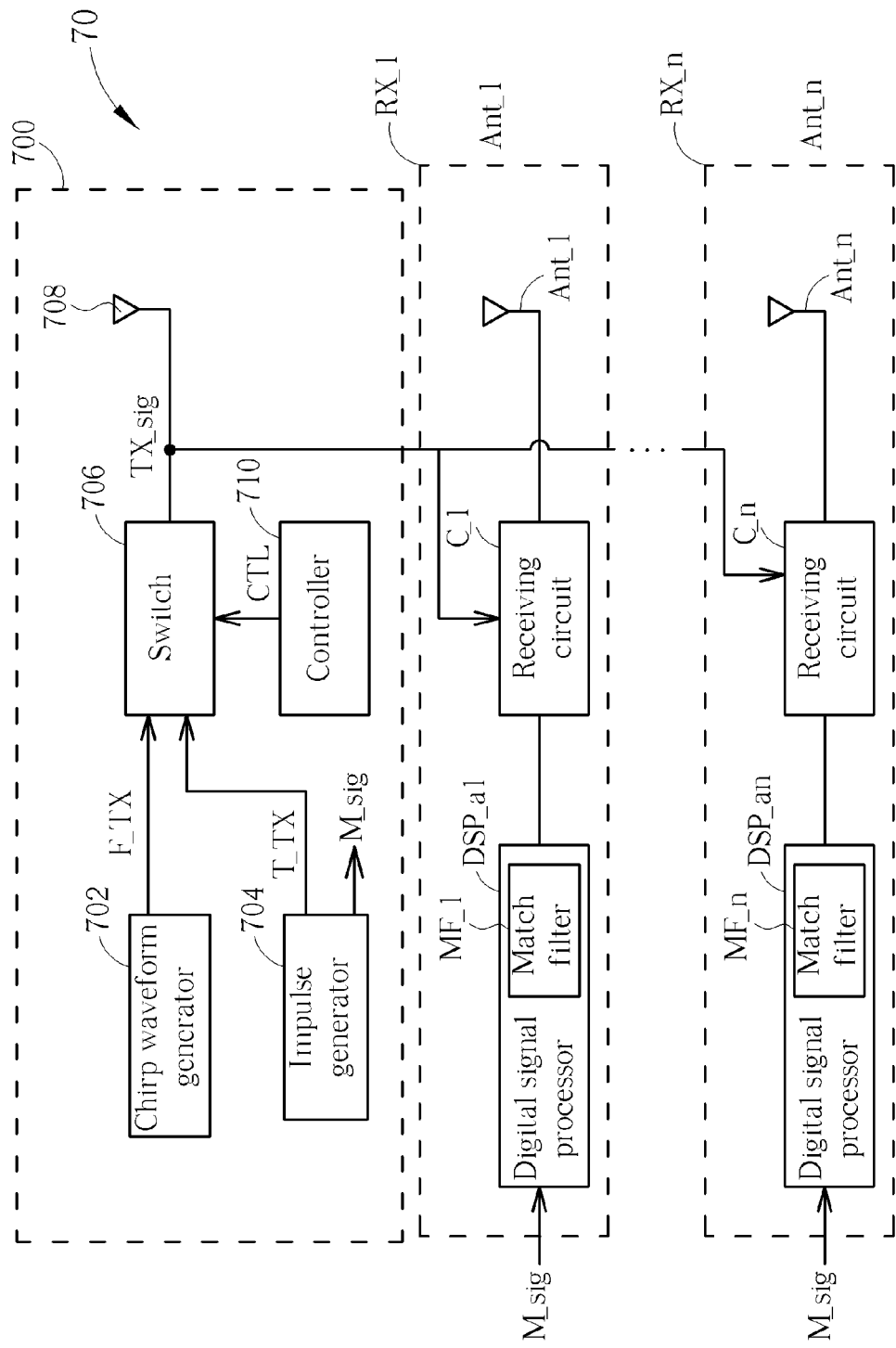
FIG. 7 is a schematic diagram of a radar system according to an embodiment of the present invention.

For example, please refer to FIG. 7. FIG. 7 is a schematic diagram of a radar system 70 according to an embodiment of the present invention. The radar system 70 is an integrated frequency-modulation compression and impulse compression radar system, and comprises a transmitting device 700 and n receiving devices RX_1-RX_n. The transmitting device 700 comprises a chirp waveform generator 702, an impulse generator 704, a switch 706, a transmitting antenna 708, and a controller 710. The chirp waveform generator 702 generates a frequency-domain output signal F_TX, and the impulse generator 704 generates a time-domain output signal T_TX.

The switch 706 switches the transmitting antenna 708 to conduct the chirp waveform generator 702 or the impulse generator 704 according to a control signal CTL generated by the controller 710, so as to emit a frequency-domain output signal F_TX or a time-domain output signal T_TX as an output signal TX_sig through the transmitting antenna 708 to the air. Besides, structures of the receiving devices RX_1-RX_n are the same as the embodiment shown in FIG. 6, and thus are denoted by the same symbols, wherein the digital signal processors DSP_a1-DSP_an may adjust the match filters MF_1-MF_n according to the mixed signal M_sig generated by the impulse generator 704, to enhance the expanding time factor for demodulation.

Figure 8A:
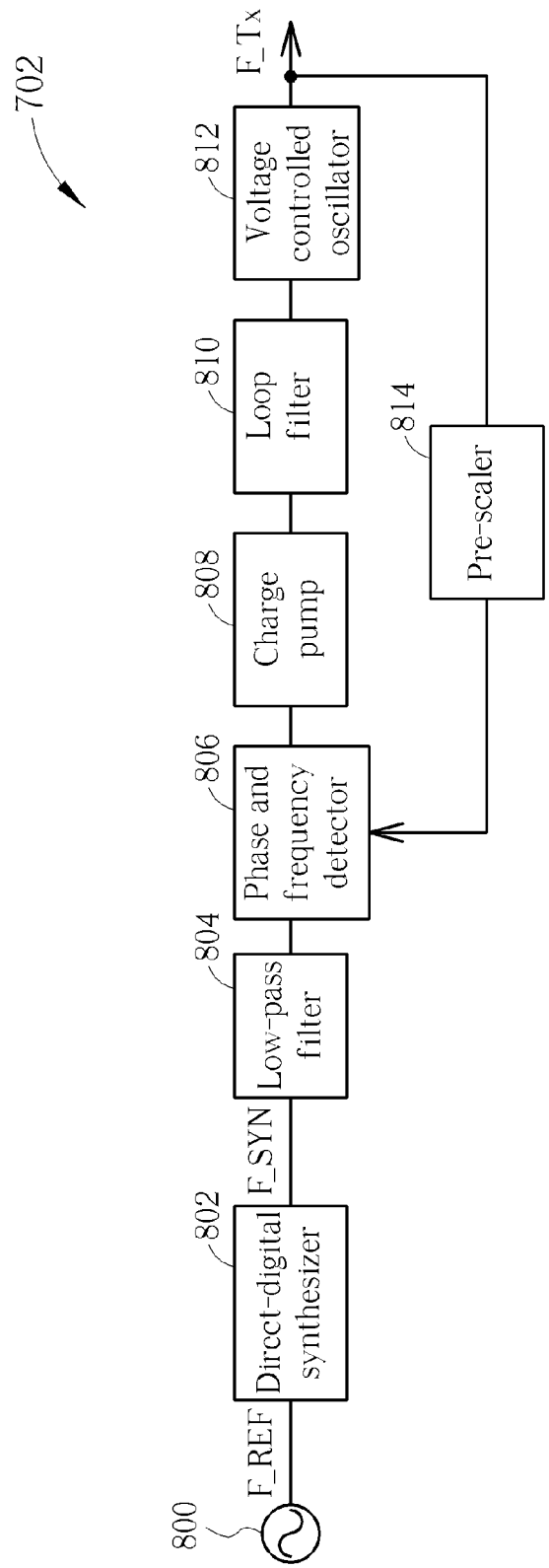
FIG. 8A is a schematic diagram of a chirp waveform generator shown in FIG. 7 according to an embodiment of the present invention.
Figure 8B:
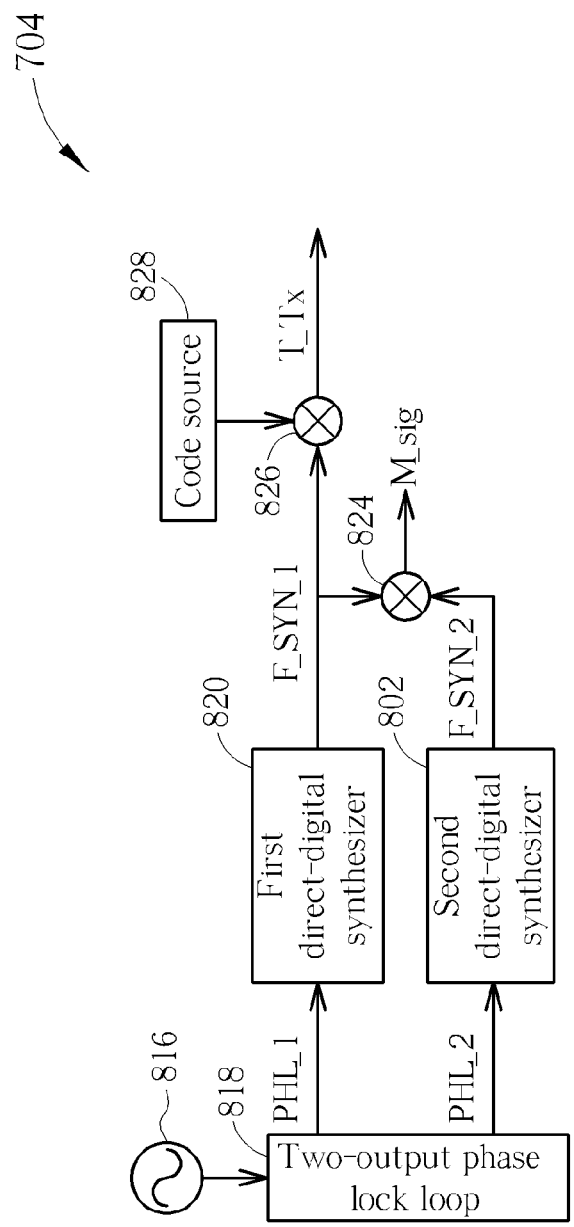
FIG. 8B is a schematic diagram of an impulse generator shown in FIG. 7 according to an embodiment of the present invention.
Figure 8C:
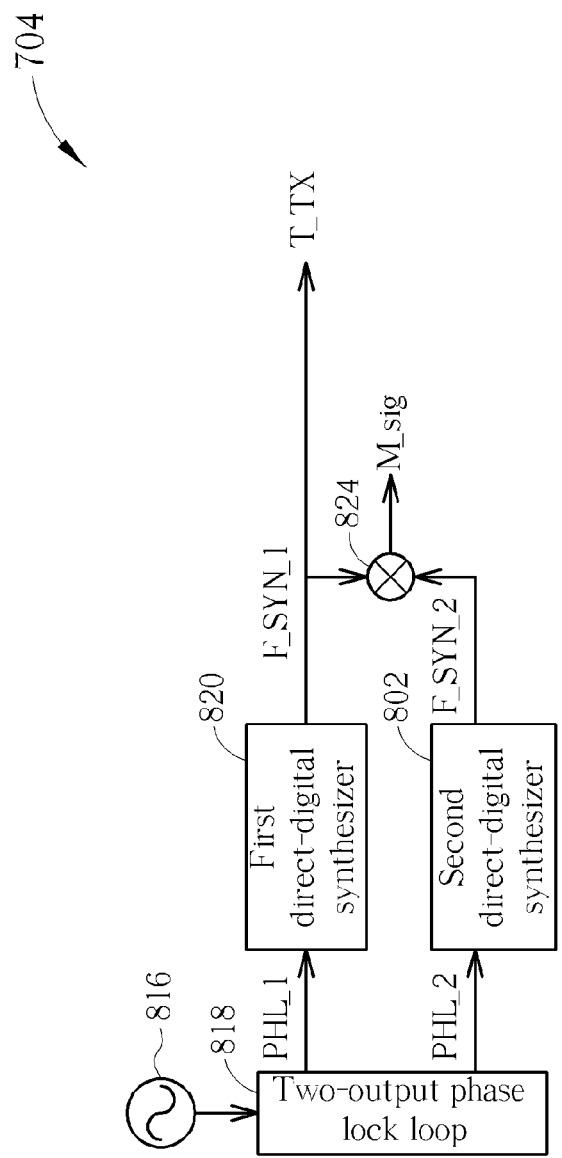
FIG. 8C is a schematic diagram of an impulse generator shown in FIG. 7 according to another embodiment of the present invention.

Please further refer to FIG. 8A, which is a schematic diagram of the chirp waveform generator 702 shown in FIG. 7 according to an embodiment of the present invention. As shown in FIG. 8A, the chirp waveform generator 702 comprises a reference frequency source 800, a direct-digital synthesizer 802, a low-pass filter 804, a phase and frequency detector 806, a charge pump 808, a loop filter 810, a voltage controlled oscillator 812 and a pre-scaler 814. As can be seen by comparing FIG. 1-5 and FIG. 8A, a structure of the chirp waveform generator 702 is similar to that of the transmitting device 100 or 500 but removes a loop switch module, and thus detailed operations thereof can be referred to the above description. On the other hand, FIG. 8B is a schematic diagram of the impulse generator 704 shown in FIG. 7 according to an embodiment of the present invention. As shown in FIG. 8B, the impulse generator 704 comprises a reference frequency source 816, a two-output phase lock loop 818, a first direct-digital synthesizer 820, a second direct-digital synthesizer 822, a first multiplier 824, a second multiplier 826 and a code source 828. As can be seen by comparing FIG. 6 and FIG. 8B, a structure of the impulse generator 704 is similar to that of the transmitting device 600, and thus detailed operations thereof can be referred to the above description. Besides, the second multiplier 826 and the code source 828 in FIG. 8B may be omitted to become an example shown in FIG. 8C, which can also be applied to the radar system 70.

Figure 9:
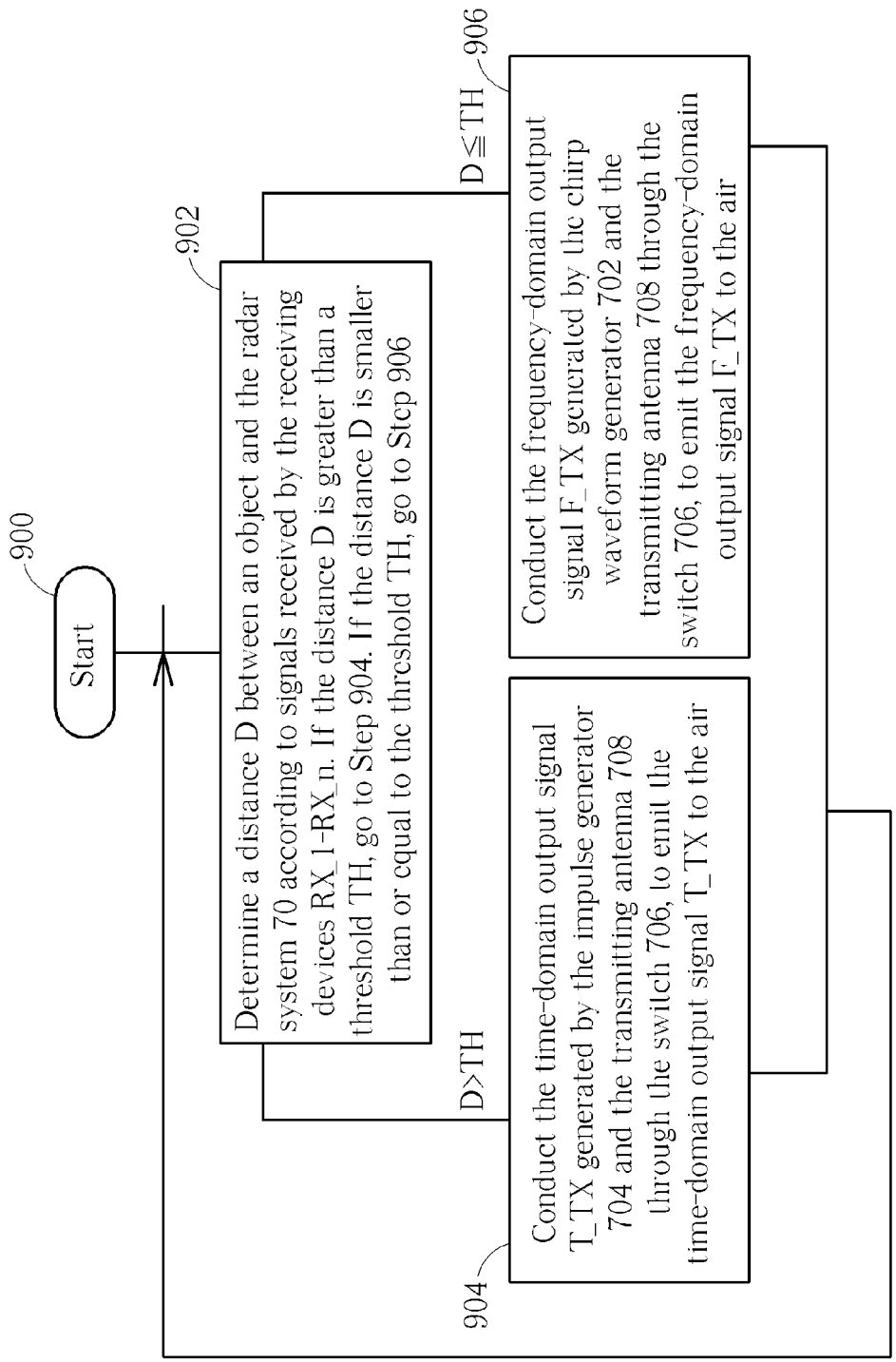
FIG. 9 is a flowchart diagram of a process according to an embodiment of the present invention.

In the radar system 70, the controller 710 conducts the transmitting antenna 708 with the chirp waveform generator 702 or the impulse generator 704 according to a distance to an object. Operations of the radar system 70 can be summarized to a process 90 as shown in FIG. 9. The process 90 includes the following steps:

Step 900: Start.

Step 902: Determine a distance D between an object and the radar system 70 according to signals received by the receiving devices RX_1-RX_n. If the distance D is greater than a threshold TH, go to Step 904. If the distance D is smaller than or equal to the threshold TH, go to Step 906.

Step 904: Conduct the time-domain output signal T_TX generated by the impulse generator 704 and the transmitting antenna 708 through the switch 706, to emit the time-domain output signal T_TX to the air.

Step 906: Conduct the frequency-domain output signal F_TX generated by the chirp waveform generator 702 and the transmitting antenna 708 through the switch 706, to emit the frequency-domain output signal F_TX to the air.

According to the process 90, when the distance D between the object and the radar system 70 is greater than the threshold TH, the controller 710 controls the switch 706 to conduct the time-domain output signal T_TX generated by the impulse generator 704 and the transmitting antenna 708, to emit the time-domain output signal T_TX to the air; when the distance D between the object and the radar system 70 is less than or equal to the threshold TH, the controller 710 controls the switch 706 to conduct the frequency-domain output signal F_TX generated by the chirp waveform generator 702 and the transmitting antenna 708, to emit the frequency-domain output signal F_TX to the air. In other words, for long distance detection, the radar system 70 is an impulse compression radar system, and for short distance detection, the radar system 70 is a frequency-modulation compression radar system. Accordingly, the application range is expanded.

Figure 10:
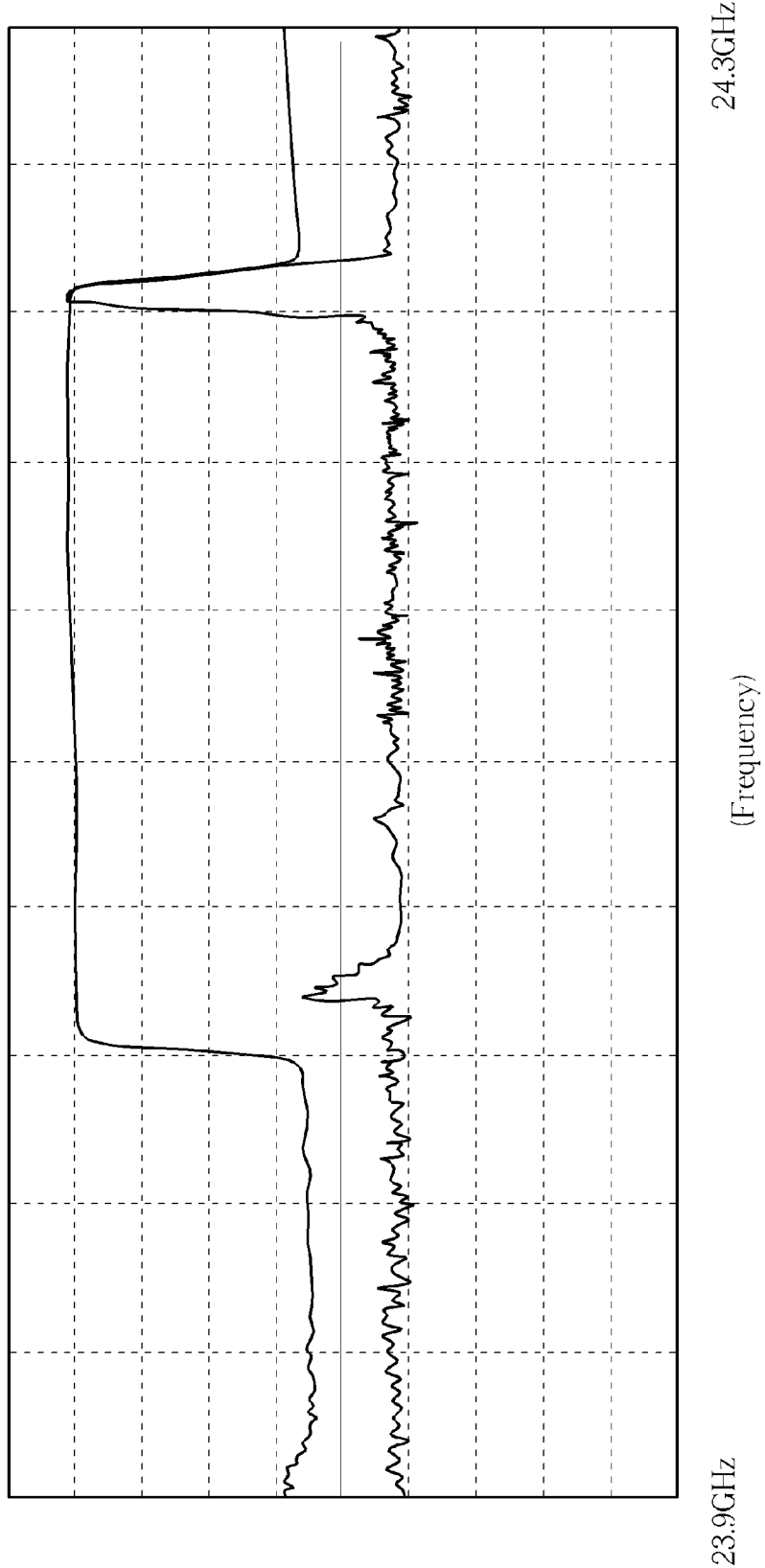
FIG. 10 is a spectrum scanning diagram when the radar system shown in FIG. 7 is applied to a car system.
Figure 11:
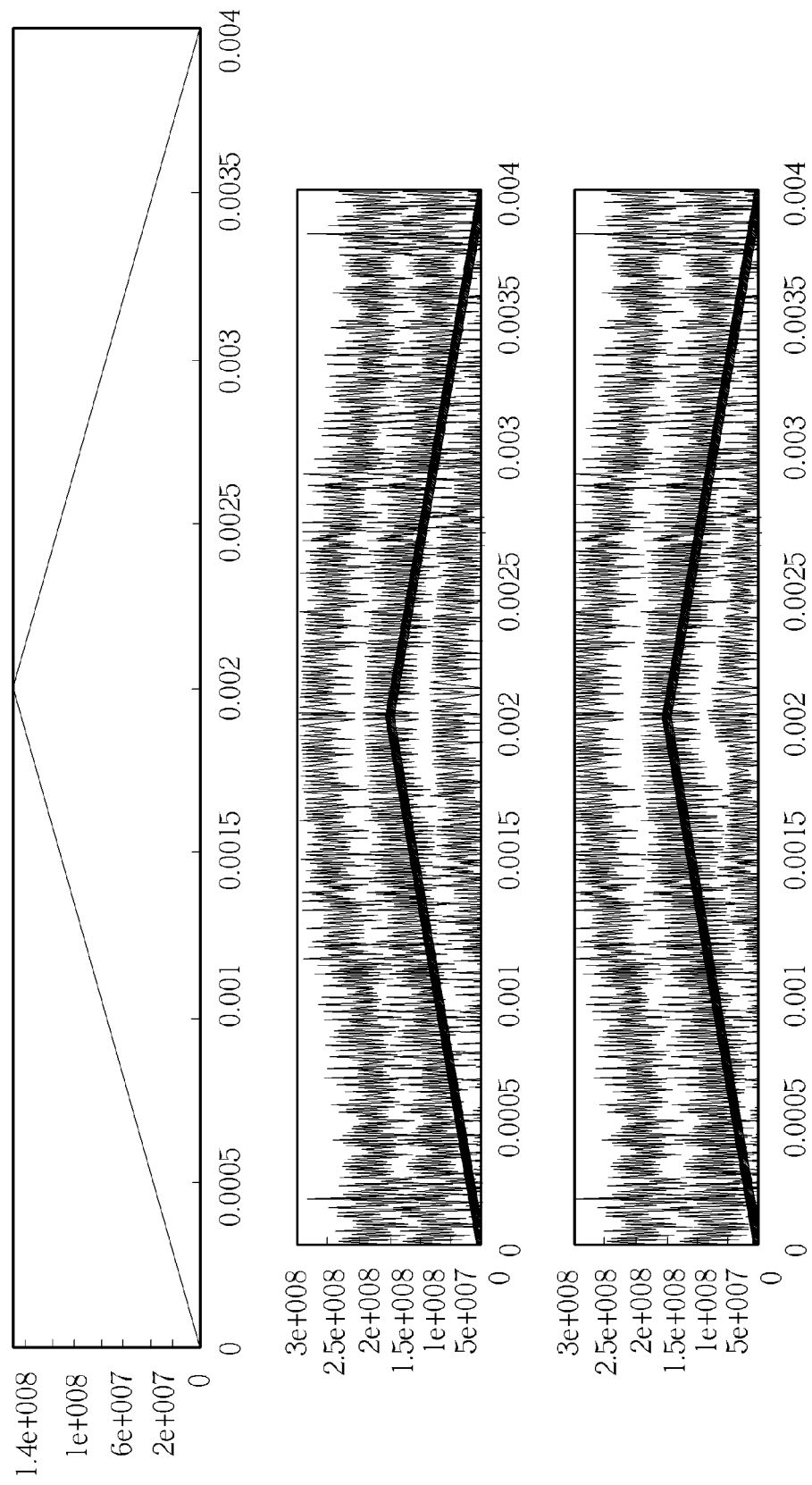
FIG. 11 is a transmitted waveform diagram when the radar system shown in FIG. 7 is applied to a car system.

Noticeably, the radar system 70 is an embodiment of the present invention, and those skilled in the art can make modifications and alterations accordingly. For example, the frequency multiplier and the power amplifier (as shown in FIG. 3) can be added to process frequency multiplication and power amplification. On the other hand, the number n of the receiving devices RX_1-RX_n and the design of the receiving circuits C_1-C_n can be modified as well. Simultaneously, those skilled in the art can apply testing equipments for signal simulation to ensure that the design meets requirements. For example, FIG. 10 and FIG. 11 are a spectrum scanning diagram and a transmitted waveform diagram respectively when the radar system 70 is applied to a car system.

In sum, the present invention provides multiple radar systems for short, middle, and long distance detection to match individual or multiple requirements, and includes the frequency-modulation compressed radar systems (as the radar systems 10, 50), the impulse compression radar system (as the radar system 60), and the compound radar system (as the radar system 70). All the radar systems have the advantages of high accuracy of measurement and simplified system structure, and are especially suitable for automotive radar systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radar system, comprising:
   a transmitting device, comprising:
      a reference frequency source, for generating a reference frequency signal;
      a direct-digital synthesizer, coupled to the reference frequency source, for generating a synthesized frequency signal according to the reference frequency signal;
      a phase lock loop, coupled to the direct-digital synthesizer, for converting the synthesized frequency signal to an output signal;
      a transmitting antenna, coupled to the phase lock loop, for emitting the output signal to the air; and
      a loop switch module, coupled to the phase lock loop, for switching the phase lock loop between an open loop mode and a closed loop mode; and
   at least one receiving device, for receiving at least one wireless signal, and processing the at least one wireless signal according to the output signal generated by the phase lock loop.

2. The radar system of claim 1, wherein the loop switch module is a switch, disposed between a loop filter and a voltage controlled oscillator of the phase lock loop.

3. The radar system of claim 1, wherein the closed loop mode is utilized for performing synchronization between the transmitting device and the at least one receiving device, and the open loop mode is utilized for stabilizing the output signal.

4. The radar system of claim 1, wherein the transmitting device further comprises a frequency multiplier and a power amplifier, connected in sequence between the phase lock loop and the transmitting antenna.

5. The radar system of claim 1, wherein the transmitting device further comprises a low-pass filter, coupled between the direct-digital synthesizer and the phase lock loop.

6. The radar system of claim 1, wherein each of the at least one receiving device converts each of the at least one wireless signal into an in-phase component and a quadrature component.

7. The radar system of claim 6, wherein each of the at least one receiving device further comprises a quadrature device, for converting the output signal generated by the phase lock loop into an in-phase signal and a quadrature signal, so as to convert each of the at least one wireless signal into the in-phase component and the quadrature component accordingly.

8. A radar system, comprising:
   a transmitting device, comprising:
      a reference frequency source, for generating a reference frequency signal;
      a two-output phase lock loop, coupled to the reference frequency source, for generating a first phase lock signal and a second phase lock signal according to the reference frequency signal;
      a first direct-digital synthesizer, coupled to the two-output phase lock loop, for generating a first synthesized frequency signal according to the first phase lock signal;
      a second direct-digital synthesizer, coupled to the two-output phase lock loop, for generating a second synthesized frequency signal according to the second phase lock signal;
      a first multiplier, coupled to the first direct-digital synthesizer and the second direct-digital synthesizer, for performing multiplication between the first synthesized frequency signal and the second synthesized frequency signal, to generate a mixed signal comprising a frequency difference between the first synthesized frequency signal and the second synthesized frequency signal; and
      a transmitting antenna, coupled to the first direct-digital synthesizer, for emitting the first synthesized frequency signal to the air; and
   at least one receiving device, for receiving at least one wireless signal, processing the at least one wireless signal according to the first synthesized frequency signal, and adjusting an expending timing factor according to the mixed signal.

9. The radar system of claim 8, wherein the transmitting device further comprises a frequency multiplier and a power amplifier, connected in sequence between the first direct-digital synthesizer and the transmitting antenna.

10. The radar system of claim 8, wherein each of the at least one receiving device converts each of the at least one wireless signal into an in-phase component and a quadrature component.

11. The radar system of claim 10, wherein each of the at least one receiving device further comprises a quadrature device, for converting the output signal generated by the phase lock loop into an in-phase signal and a quadrature signal, so as to convert each of the at least one wireless signal into the in-phase component and the quadrature component accordingly.

12. The radar system of claim 8, wherein the transmitting device further comprises:
- a code source, for generating a sequence code; and
- a second multiplier, coupled to the code source, the first direct-digital synthesizer and the transmitting antenna, for performing multiplication between the sequence code and the first synthesized frequency signal, and outputting a corresponding multiplication result as the first synthesized frequency signal to the transmitting antenna.

13. A radar system, comprising:
a transmitting device, comprising:
- a chirp waveform generator, for generating a frequency-domain output signal;
- an impulse generator, for generating a time-domain output signal;
- a transmitting antenna;
- a switch, comprising two input terminals coupled to the chirp waveform generator and the impulse generator, and an output terminal coupled to the transmitting antenna, for switching the transmitting antenna to conduct the chirp waveform generator or the impulse generator according to a control signal, so as to emit the frequency-domain output signal or the time-domain output signal through the transmitting antenna to the air; and
- a controller, for generating the control signal according to a distance between an object and the radar system; and
at least one receiving device, for receiving at least one wireless signal, and processing the at least one wireless signal according to signals outputted from the switch to the transmitting antenna.

14. The radar system of claim 13, wherein the chirp waveform generator comprises:
- a reference frequency source, for generating a reference frequency signal;
- a direct-digital synthesizer, coupled to the reference frequency source, for generating a synthesized frequency signal according to the reference frequency signal; and
- a phase lock loop, coupled between the direct-digital synthesizer and the switch, for converting the synthesized frequency signal to the frequency-domain output signal.

15. The radar system of claim 14, wherein the chirp waveform generator further comprises a frequency multiplier and a power amplifier, connected in sequence between the phase lock loop and the switch.

16. The radar system of claim 14, wherein the chirp waveform generator further comprises a low-pass filter coupled between the direct-digital synthesizer and the phase lock loop.

17. The radar system of claim 13, wherein the impulse generator comprises:
- a reference frequency source, for generating a reference frequency signal;
- a two-output phase lock loop, coupled to the reference frequency source, for generating a first phase lock signal and a second phase lock signal according to the reference frequency signal;
- a first direct-digital synthesizer, coupled between the two-output phase lock loop and the switch, for generating a first synthesized frequency signal as the time-domain output signal according to the first phase lock signal;
- a second direct-digital synthesizer, coupled to the two-output phase lock loop, for generating a second synthesized frequency signal according to the second phase lock signal; and
- a first multiplier, coupled between the first direct-digital synthesizer and the second direct-digital synthesizer, for performing multiplication between the first synthesized frequency signal and the second synthesized frequency signal, to generate a mixed signal comprising a frequency difference between the first synthesized frequency signal and the second synthesized frequency signal;
wherein the at least one receiving device is further utilized for adjusting an expending timing factor according to the mixed signal.

18. The radar system of claim 17, wherein the impulse generator further comprises a frequency multiplier and a power amplifier, connected in sequence between the first direct-digital synthesizer and the transmitting antenna.

19. The radar system of claim 17, wherein the impulse generator further comprises:
- a code source, for generating a sequence code; and
- a second multiplier, coupled to the code source, the first direct-digital synthesizer and the switch, for performing multiplication between the sequence code and the first synthesized frequency signal, and outputting a corresponding multiplication result as the time-domain output signal to the switch.

20. The radar system of claim 13, wherein each of the at least one receiving device converts each of the at least one wireless signal into an in-phase component and a quadrature component.

21. The radar system of claim 20, wherein each of the at least one receiving device further comprises a quadrature device, for converting signals outputted from the switch to the transmitting antenna into an in-phase signal and a quadrature signal, so as to convert each of the at least one wireless signal into the in-phase component and the quadrature component accordingly.

22. The radar system of claim 13, wherein the controller controls the switch through the control signal to conduct the transmitting antenna and the impulse generator when the at least one receiving device indicates that the distance between the object and the radar system is greater than a threshold, and controls the switch through the control signal to conduct the transmitting antenna and the chirp waveform generator when the at least one receiving device indicates that the distance between the object and the radar system is less or equal to the threshold.

23. A control method for a radar system, a transmitting device of the radar system comprising a chirp waveform generator and an impulse generator, for generating a frequency-domain output signal and a time-domain output signal respectively, the control method comprising:
- determining a distance between an object and the radar system according to signals received by at least one receiving device of the radar system; and
- emitting the time-domain output signal generated by the impulse generator to the air when the distance is greater than a threshold, and emitting the frequency-domain output signal generated by the chirp waveform generator to the air when the distance is less or equal to the threshold.

* * * * *